United States Patent [19]

Martini

[11] 4,141,129
[45] Feb. 27, 1979

[54] O-RING INSERTION TOOL

[76] Inventor: Leonard J. Martini, 2801 Ocean Front Walk, F, San Diego, Calif. 92109

[21] Appl. No.: 722,226

[22] Filed: Sep. 27, 1976

[51] Int. Cl.² .............................................. B23P 19/02
[52] U.S. Cl. ................................................... 29/235
[58] Field of Search ...................................... 29/235

[56] References Cited

U.S. PATENT DOCUMENTS

| | | | |
|---|---|---|---|
| 3,605,238 | 9/1971 | Eschholz | 29/235 |
| 3,704,505 | 12/1972 | Lacer et al. | 29/235 |
| 3,940,840 | 3/1976 | Bellia | 29/235 |
| 3,990,138 | 11/1976 | Bellia | 29/235 |

FOREIGN PATENT DOCUMENTS 2444896  4/1975  Fed. Rep. of Germany ............. 29/235

*Primary Examiner*—James L. Jones, Jr.

[57] ABSTRACT

An O-ring insertion tool for installing O-rings, packings, or seals of various flexible materials into female seal grooves; especially those grooves remotely located, may include a syringe configuration consisting of a barrel and disc-like mandrel that forms an annular opening through which such a seal as forementioned may be ejected at a specifically desired location, and a plunger from which the ejection method is initiated and controlled. With such an arrangement O-rings and other seals of various flexible materials can be easily installed into deeply located female grooves hidden within complicated mechanical parts or assemblies of such.

4 Claims, 5 Drawing Figures

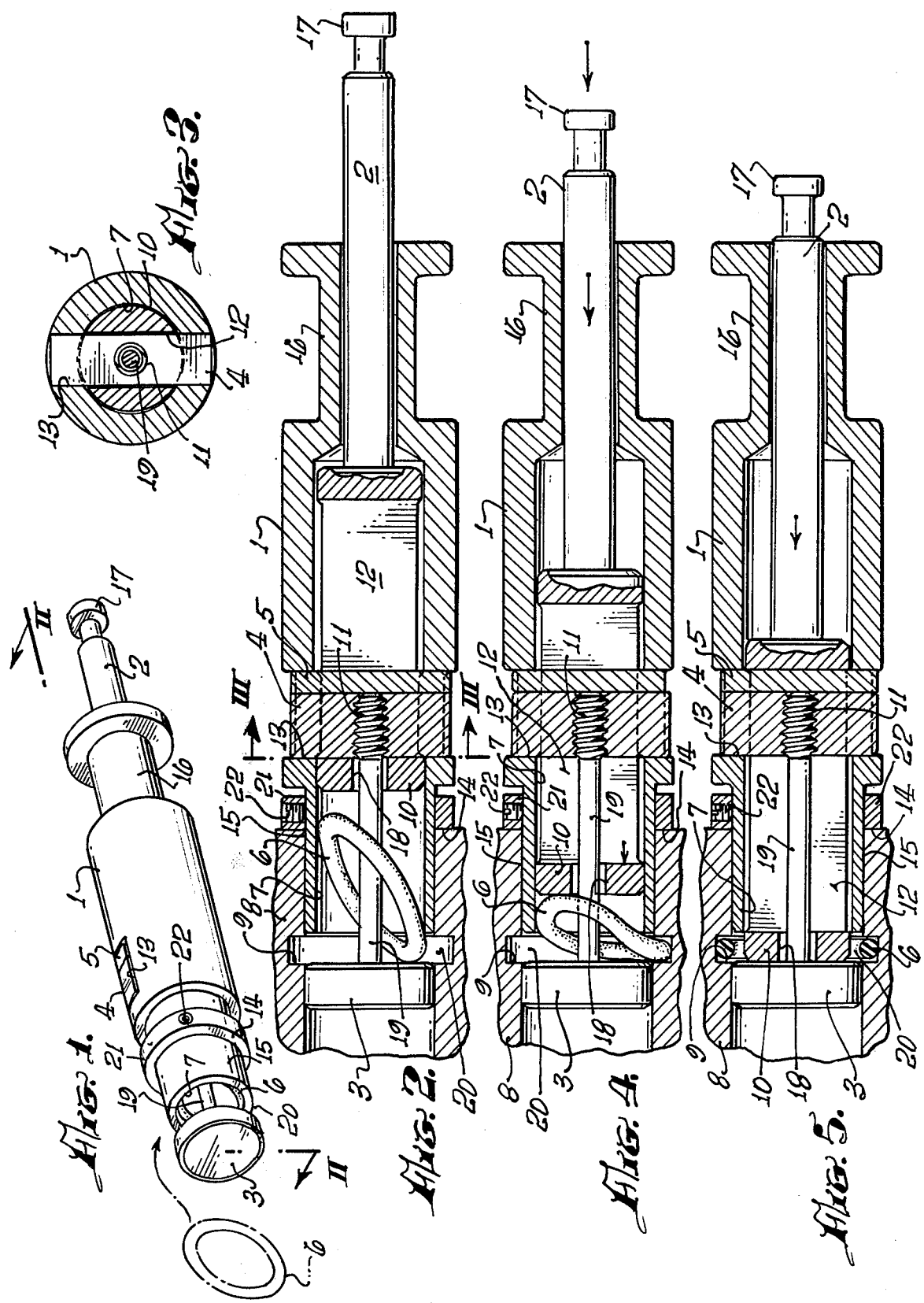

O-RING INSERTION TOOL

BACKGROUND OF THE INVENTION

Insertion of O-rings and other flexible seals into deeply located female grooves is presently accomplished by arduous hand and/or probe methods. Such methods demand technical experience, physical dexterity, sometimes small fingers, and most always excessive time and patience. Because of this, mechanical parts and assemblies are usually designed with O-ring access ports and/or additional parts and/or component assemblies to provide for O-ring installation, resulting in excessive tolerance stackup and sometimes even compromise of the intended mechanical function. For example, a hydraulic valve with a deeply located female O-ring seal for a reciprocating piston had to be designed within a housing insert which in turn had to have at least one static seal (usually two) and a method of containment, usually a threaded section or bearing land for a retaining ring. This housing insert design not only required additional O-ring seals, doubling the chance for leakage, but because it was an additional part the allowable tolerances for the assembly (the valve body, housing insert, and retaining ring) had to be reduced by a factor of at least three; the inside diameter of the seal-housing insert had to be concentric to its outside diameter which fits into the bore of the valve body so that the reciprocating piston could be concentric to the valve body. A theoretically simple seal design had therefore required such complications, resulting in extra cost just because an O-ring seal could not be installed reliably.

SUMMARY OF THE INVENTION

The present invention has overcome the afore-mentioned problems by providing a reliable and convenient method of seal installation within deep bores precluding excessive tolerances and compromising designs. The O-ring insertion tool includes a syringe configuration consisting of a barrel and disc-like mandrel that forms an annular opening through which an O-ring, packing, or seal of any flexible material may be ejected by a specifically desired location, and a plunger from which the ejection method is initiated and controlled. The syringe, previously loaded with an O-ring or other seal, is placed within the bore containing the deeply placed gland and the plunger is now depressed, pushing the O-ring or other seal from the syringe and into the desired deeply placed groove. With such an arrangement O-rings and other seals of various flexible materials can be easily installed into deeply located female grooves hidden within complicated mechanical parts or assemblies of such. Accordingly, arduous hand and/or probe methods of seal installation and design compromise are eliminated through the use of a now convenient and reliable insertion tool.

STATEMENT OF THE OBJECTS OF INVENTION

The major object of the present invention is to overcome the aforementioned problems associated with prior installation requirements for O-rings and other flexible seals; such as additional parts or component assemblies, arduous hand and/or probe methods of seal installation, demand for technical experience, physical dexterity, and excessive time and patience.

Another object is to provide an easy, but reliable, external method of seal installation while eliminating the possibility of seal damage due to improper installation techniques.

Other objects, advantages, and novel features of the invention will become apparent from the following detailed description of the invention, when considered in conjunction with the accompanying drawing wherein:

BRIEF DESCRIPTION OF THE DRAWING

FIG. 1 is an isometric view of the O-ring insertion tool with O-ring being loaded into tool.

FIG. 2 is a cross-sectional view taken along plane II—II of FIG. 1; showing the O-ring loaded and the tool slid into the bore of a part containing a deeply located female O-ring groove.

FIG. 3 is a cross-sectional view taken along plane III—III of FIG. 2; showing the rectangular slot within the tool barrel accommodating the brackets that support the stem and disc-like mandrel.

FIG. 4 is similar to FIG. 2 except the plunger is ejecting the O-ring seal into the O-ring groove.

FIG. 5 is similar to FIG. 4 except the plunger is at the end of its forward stroke, and the O-ring seal has been ejected into the O-ring groove, and the O-ring insertion tool is ready to be extracted from the bore of the part.

DESCRIPTION OF THE PREFERRED EMBODIMENT

Referring now to the drawing, wherein like reference numerals designate like or similar parts throughout the several views, there is illustrated in FIG. 1 an O-ring insertion tool being loaded with a flexible O-ring seal 6; over the disc-like mandrel 3 of the stem 19 and into the inside cavity 7 of the tool being created by the internal diameter of the barrel 1 and the drawn-back plunger 2. The disc-like mandrel 3 is located beyond the barrel 1 by the stem 19 such that the mandrel 3 and barrel 1 form an annular opening 20 from which the O-ring seal 6 can be ejected. The stem 19 is rigidly fixed to the barrel 1 by the wedge action between the two brackets 4 and 5 maintained through the jacking or separation action of the threaded portion 11 of the stem 19. This is shown in FIG. 2. In other words, the threaded portion 11 of the stem 19 is screwed through bracket 4, bearing up against bracket 5, separating both brackets and frictionally locking them within the provided rectangular slot 13 in the barrel 1. FIG. 3 shows a cross-sectional view of this slot. The barrel 1 may be of such a shape to provide an external, reduced diameter 16 where the tool may be held between two fingers of the hand and the thumb of that same hand may be placed on the top surface 17 of the plunger 2.

The plunger 2 is provided with a slot or cavity 12 which surrounds the brackets 4 and 5. The plunger 2 (at its end 10) also contains a hole 18 through which the stem 19 may pass. In this configuration, the plunger 2 may be pushed and pulled to the limits of the barrel cavity 7. When the plunger 2 is in the pulled condition, cavity 7 is created for the O-ring seal 6 within the barrel 1; when it is pushed, the cavity 7 is decreased and the O-ring seal 6 is forced into the deeply located O-ring groove 9 of a part 8, FIGS. 4 and 5. The barrel 1 has an external diameter 15, equal to the diameter of the disc-like mandrel 3 and both are of size to fit within the bore of part 8. This external diameter 15 extends to land 14 provided by the collar 21 which is adjusted and locked into place by the set screw 22 such that the tool is properly positioned within the bore of the part 8. Properly positioned means the disc-like mandrel 3 is located just beyond the female groove 9 within the bore.

OPERATION OF THE INVENTION

In the operation of the invention the plunger 2 of the O-ring insertion tool is pulled back to its limit creating the barrel cavity 7 in which the O-ring seal 6 may be positioned, sliding over the mandrel 3 and stem 19, as illustrated in FIG. 1. The O-ring insertion tool is ready for actuation when the O-ring seal 6 is positioned within as shown in FIG. 2. Holding the handle 16 of the barrel 1 between the fore and second fingers and the thumb of the same hand on the top 17 of the plunger 2 (like holding a syringe), the tool may be installed within the bore of a part 8 containing a deeply located O-ring groove 9. The tool is installed into the bore of the part 8 until the land 14 of the collar 21 encounters the part 8, FIGS. 2, 4, and 5. With the barrel 1 held firmly in place, land 14 bearing against the part 8 such that the annular opening 20 between the barrel 1 and the mandrel 3 is positioned at the O-ring groove 9, the plunger 2 is now pushed with the thumb at its top 17. The forward end 10 of the plunger 2 in turn pushes the O-ring seal 6 into the O-ring groove 9 as illustrated in FIG. 4. While so doing, the plunger end 10 causes the O-ring seal 6 to form into the contour of the O-ring groove as shown in FIG. 5. The O-ring 6 has now been inserted into the O-ring groove 9 and the tool may be extracted (pulled out of) from the bore of the part 8 leaving the O-ring seal 6 properly installed within the groove 9.

It is now readily apparent that the present invention provides a very unique and reliable means for installing an O-ring seal into a deeply located O-ring groove with all of the forementioned advantages.

Obviously, many modifications and variations of the present invention are possible in the light of the above teachings. It is therefore to be understood that within the scope of the appended claims the invention may be practiced otherwise than as specifically described.

I claim:

1. A tool for inserting an O-ring into a female O-ring groove within a bore comprising:
   a syringe-like barrel for receiving the O-ring and capable of being inserted into the bore to a selected depth;
   means connected to the barrel for forming an annular space at the end of the barrel;
   plunger means slidable within the barrel for ejecting the O-ring seal out of the annular opening and into the O-ring groove within the bore;
   a stem extending foward beyond a forward open end of the barrel, and
   a disk-like mandrel axially connected to the forward end of the stem;
   said mandrel being slidable within the bore containing the female O-ring groove and so that the foward extension of the stem can position the mandrel just beyond the female groove within the bore;
   a pair of brackets;
   said stem extending axially through the forward end of the plunger means and fixedly mounted to the brackets;
   the ejecting means being a plunger which has an elongated transverse slot;
   said brackets slidably extending through the plunger means within the slot and fixed to the barrel so that the plunger means can reciprocate within the barrel between forward and aft positions within the limits of the slot whereby an O-ring can be disposed from the barrel cavity and inserted into the female groove by squeezing the O-ring beteen the mandrel and the forward end of the plunger means;
   a rectangular slot through the barrel of size to contain said brackets;
   said stem having threaded end screwed through forward bracket and bearing against aft bracket, thus separating the two brackets and frictionally fixing them within the rectangular slot in the barrel.

2. A combination as claimed in claim 1 including:
   a collar;
   said collar surrounding the external forward diameter of barrel and providing a locking means of selecting a depth to which barrel may extend into the bore containing the O-ring groove;
   a set screw through said collar to lock collar onto barrel at selected depth-location.

3. A combination as claimed in claim 2 including:
   said barrel having a reduced diameter at aft end forming a syringe-like handle for the O-ring insertion tool, and
   said plunger having a reduced diameter at aft end forming a handle such that it may be pulled to its aft position.

4. A tool for inserting an O-ring into a female O-ring groove within a bore comprising:
   a syringe-like barrel for receiving the O-ring and capable of being inserted into the bore to a selected depth;
   means connected to the barrel for forming an annular space at the end of the barrel;
   plunger means slidable within the barrel for ejecting the O-ring seal out of the annular opening and into the O-ring groove within the bore;
   a stem extending forward beyond a forward open end of the barrel, and
   a disk-like mandrel axially connected to the forward end of the stem;
   said mandrel being slidable within the bore containing the female O-ring groove and so that the forward extension of the stem can position the mandrel just beyond the female groove within the bore;
   a bracket;
   said stem extending axially through the forward end of the plunger means and fixedly mounted to the bracket;
   the ejecting means being a plunger which has an elongated transverse slot;
   said bracket extending through the plunger means within the slot and fixed to the barrel so that the plunger means can reciprocate within the barrel between forward and aft positions within the limits of the slot, whereby an O-ring can be disposed from the barrel cavity and inserted into the female groove by squeezing the O-ring between the mandrel and the forward end of the plunger means; and
   a slot through the barrel of size to contain said bracket.

* * * * *